UNITED STATES PATENT OFFICE.

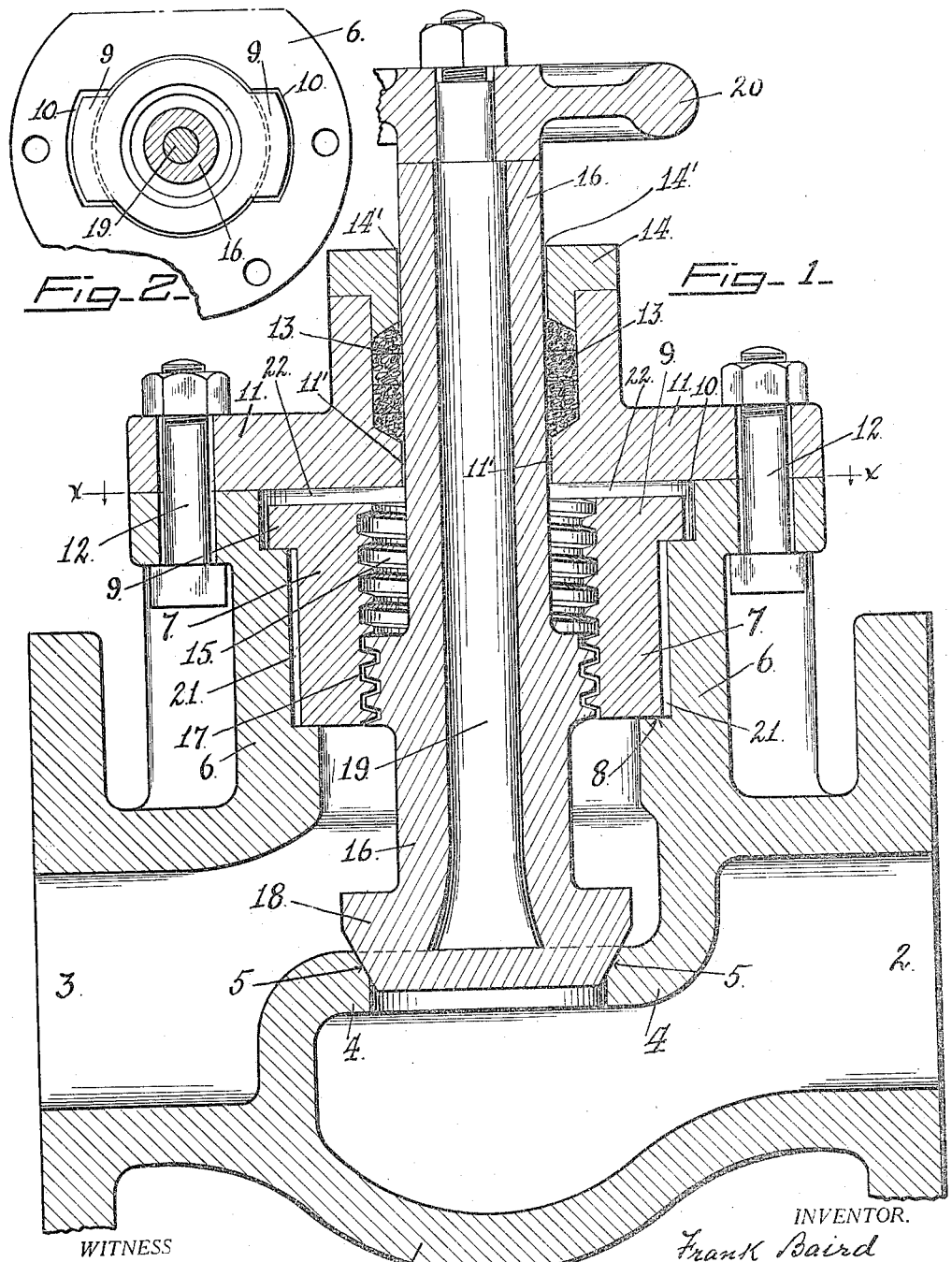

FRANK BAIRD, OF BERKELEY, CALIFORNIA, ASSIGNOR TO PACIFIC FOUNDRY COMPANY, OF SAN FRANCISCO, CALIFORNIA, A CORPORATION OF CALIFORNIA.

VALVE.

1,196,199.  Specification of Letters Patent.  Patented Aug. 29, 1916.

Application filed February 3, 1916. Serial No. 75,915.

*To all whom it may concern:*

Be it known that I, FRANK BAIRD, a citizen of the United States, residing at Berkeley, in the county of Alameda and State of California, have invented certain new and useful Improvements in Valves, of which the following is a specification.

My invention relates to the class of valves, and more particularly to a shut-off valve of the so-called globe type, which is constructed for use in connection with corrosive fluids, such as acids or alkalis, or other similar fluids.

The object of my invention is to provide a valve of the type described which has as few movable joints as possible exposed to the action of the corrosive fluid, and which, by reason of its peculiar construction, can be made of materials not subject to attack by such corrosive fluid. The common types of valves, particularly those which provide a flexible joint between the head and the stem, require considerable accurate machining and finishing, and must, therefore, be made of material capable of being so machined. On account of the novel construction which comprises my invention, however, my valve can be made without any machining of the interior parts exposed to the corrosive fluid, with the exception of grinding the coacting surfaces of the seat and the head, to insure a tight seal when the valve is closed. Materials which cannot be machined, but which are otherwise highly advantageous on account of their power of resisting the action of corrosive fluids, may therefore be used. Such materials include alloys or mixtures containing iron, which may readily be cast into any desired form when molten, but which cannot be worked or machined when cold, except by grinding.

To this end my invention consists in the novel valve which I shall now fully describe by reference to the accompanying drawings, in which—

Figure 1 is a central longitudinal section of my valve. Fig. 2 is a horizontal section, reduced, taken on the line *x—x* of Fig. 1, and viewed in the direction of the arrows.

In the drawings, the reference numeral 1 designates a body or shell, formed in the usual manner with a fluid passage therethrough having an inlet opening 2 and an outlet opening 3, separated by a ported diaphragm 4, in which is formed the valve seat 5. The body 1 is also formed with an upstanding barrel portion 6, within the substantially cylindrical bore of which is a loosely fitting guide nut 7, resting upon a shoulder 8 in the bore of said barrel, and provided with lugs 9, adapted to lie within corresponding recesses 10, to prevent said nut 7 from turning. A bonnet 11, secured to the upper open end of the barrel 6 as by means of bolts 12, and provided with packing 13 and a packing nut 14, forms a closure for said barrel, and retains the nut 7 therewithin.

The nut 7 is interiorly threaded, as shown at 15. A stem 16, provided with a threaded portion 17 adapted to engage the threads of said nut, has formed upon its lower end a fixed head 18 adapted to coact with the seat 5 to form a tight seal. On account of the nature of the material of which said stem is preferably made, it is desirable to provide a reinforcement therefor, consisting of an interior rod 19 of steel or other suitable metal, to the upper projecting end of which is attached a handle 20.

The nut 7 has considerable play within the barrel 6, as is indicated in the drawings by the clearance spaces 21 and 22. Moreover, clearance is allowed at 11', where the stem 16 passes through the bonnet 11, and at 14' where it passes through the packing nut 14. The stem 16 is thus permitted a certain amount of free movement, both laterally and vertically, the packing 13 acting as a fulcrum on which said stem may rock and move while forming a tight joint around said stem to prevent leakage. This movement of the stem allows the integral head 18 to accurately find its seat upon the diaphragm 4, when the valve is closed, without causing any undue strains upon either the stem or the diaphragm. By this construction the necessity for a flexible connection between the stem and head is eliminated.

As has been stated before, my valve may be made of a material which is not subject to the action of corrosive fluids, and which, on account of its extreme hardness or other physical characteristics, cannot easily be machined or finished. All parts of the valve exposed to the fluid, viz:—the shell 1, the stem 16 with its integral head 18, the nut 7, and the bonnet 11, can be cast and used practically in the rough. On account of the necessary play permitted to the stem 16, the threads of both the nut 7 and said stem may be cast, and need no finishing. The exterior surfaces of the nut 7, where it fits loosely within the barrel 6, can also be left rough. The coacting surfaces of the seat 5 and the head 18 can be finished to a perfect seat by grinding, as can also, if necessary, the surface of the stem 16 where it passes through the packing 13. Thus no machine work, with the exception of the mentioned grinding, need be done upon the interior parts of the valve.

I do not wish to limit myself to the particular form of construction herein illustrated and described, for the reason that many changes may be made therein without in any way affecting the principles of the invention.

I claim:—

A valve comprising a shell formed with an inlet and an outlet passage and an intervening port; a nut locked in the shell against rotation on its axis, and having clearances in its seat adapting it for lateral rocking movement in all planes; a port-controlling head having a stem rigid therewith, said stem being threaded through the nut for lineal movement and adapted to rock therewith; a bonnet secured to the shell and through which the stem of the port controlling head passes with clearances providing for its rocking movement; and packing confined in the bonnet about said stem and serving as the fulcrum upon which the stem rocks.

In testimony whereof I have signed my name to this specification in the presence of two subscribing witnesses.

FRANK BAIRD.

Witnesses:
WM. F. BOOTH,
D. B. RICHARDS.

Copies of this patent may be obtained for five cents each, by addressing the "Commissioner of Patents. Washington, D. C."